(12) United States Patent
Adams et al.

(10) Patent No.: US 7,704,067 B2
(45) Date of Patent: Apr. 27, 2010

(54) METHOD AND MOLD FOR MAKING NON-METALLIC FIBER REINFORCED PARTS

(75) Inventors: Thomas R. Adams, Huntington Beach, CA (US); Gary R. Wittman, Costa Mesa, CA (US)

(73) Assignee: Tiodize Company, Inc., Huntington Beach, CA (US)

( * ) Notice: Subject to any disclaimer, the term of this patent is extended or adjusted under 35 U.S.C. 154(b) by 432 days.

(21) Appl. No.: 11/348,483

(22) Filed: Feb. 7, 2006

(65) Prior Publication Data

US 2007/0182065 A1    Aug. 9, 2007

(51) Int. Cl.
    B29C 43/18    (2006.01)
(52) U.S. Cl. ................ 425/393; 425/383; 425/392; 425/398; 425/399
(58) Field of Classification Search .......... 425/393, 425/398, 399, 383, DIG. 5, 392, 403
    See application file for complete search history.

(56) References Cited

U.S. PATENT DOCUMENTS

| | | | | |
|---|---|---|---|---|
| 1,386,003 A | * | 8/1921 | Kempton | 264/324 |
| 1,475,032 A | * | 11/1923 | Shrum et al. | 72/397 |
| 1,935,832 A | * | 11/1933 | De Lackner | 425/393 |
| 2,017,018 A | * | 10/1935 | Seastrom | 425/393 |
| 3,677,684 A | * | 7/1972 | Platz | 425/393 |
| 3,749,543 A | * | 7/1973 | Stansbury | 425/393 |
| 3,857,666 A | * | 12/1974 | Barnett | 425/393 |
| 3,949,045 A | * | 4/1976 | Hess et al. | 264/296 |
| 3,960,472 A | * | 6/1976 | O'Connor et al. | 425/393 |
| 3,989,439 A | * | 11/1976 | Schmitzberger | 425/393 |
| 3,998,578 A | * | 12/1976 | Acda | 425/393 |
| RE29,446 E | * | 10/1977 | Sonnleitner et al. | 425/297 |
| 4,107,249 A | * | 8/1978 | Murai et al. | 264/68 |
| 4,157,372 A | * | 6/1979 | Kyomen | 264/296 |
| 4,167,388 A | * | 9/1979 | Keelor et al. | 425/387.1 |
| 4,217,084 A | * | 8/1980 | Jacques et al. | 425/321 |
| 4,238,180 A | * | 12/1980 | Gordon et al. | 425/403 |
| 4,279,585 A | * | 7/1981 | Arndt et al. | 425/403 |

(Continued)

*Primary Examiner*—Eric Hug
*Assistant Examiner*—Seyed Masoud Malekzadeh
(74) *Attorney, Agent, or Firm*—Morland C. Fischer

(57) ABSTRACT

A mold and a method for molding high strength, non-metallic fiber reinforced composite parts having a variety of (e.g., cylindrical) shapes that are lighter in weight than similar parts manufactured from metal. An unmolded non-metallic pre-form having long continuous fibers is placed around a mandrel, and a segmented, adjustable diameter compression ring is disposed in surrounding engagement with the pre-form at an upper position within an inwardly tapered compression ring support. The compression ring is formed from a plurality of loose compression ring segments that are initially spaced circumferentially from one another at the upper position of the compression ring support. The mandrel and the pre-form are first heated and then located in a press. The press is closed to push the compression ring and the heated mandrel from the upper position of the compression ring support, at which the compression ring has an open configuration and a wide diameter, to a lower position, at which the compression ring has a closed configuration and a narrow diameter. As the compression ring is pushed to the lower position, the compression ring segments slide along the inwardly tapered compression ring support so as to be moved end-to-end one another to apply a compressive force for consolidating and shaping the heated pre-form into the molded part.

8 Claims, 4 Drawing Sheets

U.S. PATENT DOCUMENTS

| | | | | |
|---|---|---|---|---|
| 4,378,928 A * | 4/1983 | Kopp et al. | ............... | 249/63 |
| 4,379,115 A * | 4/1983 | Seach et al. | ............... | 264/296 |
| 4,383,819 A * | 5/1983 | Letica | ............... | 425/577 |
| 4,389,180 A * | 6/1983 | Gordon | ............... | 425/403 |
| 4,412,802 A * | 11/1983 | Ohta et al. | ............... | 425/392 |
| 4,480,979 A * | 11/1984 | Keith et al. | ............... | 425/403 |
| 4,551,293 A * | 11/1985 | Diehl et al. | ............... | 264/150 |
| 4,943,405 A * | 7/1990 | Keller et al. | ............... | 264/322 |
| 4,960,556 A * | 10/1990 | Oehlenschlaeger et al. | .. | 264/322 |
| 5,024,592 A * | 6/1991 | Abplanalp et al. | ............... | 425/112 |
| 5,049,060 A * | 9/1991 | O'Leary | ............... | 425/393 |
| 5,518,676 A * | 5/1996 | de Rocheprise | ............... | 264/127 |
| 5,637,332 A * | 6/1997 | Ridout | ............... | 425/356 |
| 5,716,572 A * | 2/1998 | Lesiczka et al. | ............... | 264/161 |
| 5,736,085 A * | 4/1998 | Brown et al. | ............... | 264/161 |
| 5,744,085 A * | 4/1998 | Sorberg | ............... | 264/296 |
| 5,843,356 A * | 12/1998 | Patel et al. | ............... | 264/161 |
| 6,083,440 A * | 7/2000 | Matsumoto et al. | ............... | 264/138 |
| 6,129,880 A * | 10/2000 | Kieras et al. | ............... | 264/230 |
| 6,413,074 B1 * | 7/2002 | Hays | ............... | 425/398 |
| 6,572,358 B1 * | 6/2003 | Blethen | ............... | 425/393 |
| 6,790,026 B2 * | 9/2004 | Vandangeot et al. | ............... | 425/510 |
| 6,981,863 B2 * | 1/2006 | Renault et al. | ............... | 425/510 |
| 6,991,447 B2 * | 1/2006 | LeClare et al. | ............... | 425/303 |
| 7,001,563 B2 * | 2/2006 | Janusson et al. | ............... | 264/512 |
| 7,438,548 B2 * | 10/2008 | Augustine et al. | ............... | 425/174.8 E |
| 2003/0111773 A1 * | 6/2003 | Janusson et al. | ............... | 264/511 |
| 2004/0017025 A1 * | 1/2004 | LeClare et al. | ............... | 264/324 |
| 2004/0250944 A1 * | 12/2004 | Dunton et al. | ............... | 156/222 |
| 2004/0253340 A1 * | 12/2004 | Tandart | ............... | 425/393 |
| 2005/0005987 A1 * | 1/2005 | Hayes et al. | ............... | 138/118 |
| 2005/0051928 A1 * | 3/2005 | Gruau et al. | ............... | 264/320 |
| 2007/0057393 A1 * | 3/2007 | Hartmann et al. | ............... | 264/40.1 |

\* cited by examiner

METHOD AND MOLD FOR MAKING NON-METALLIC FIBER REINFORCED PARTS

BACKGROUND OF THE INVENTION

1. Field of the Invention

This invention relates to a mold including a segmented adjustable diameter compression ring and a tapered compression ring support and to a method for molding high strength, non-metallic fiber reinforced composite parts having a variety of different shapes to be substituted for heavier metal parts.

2. Background Art

Parts such as fasteners, connectors, couplers, and the like, have long been manufactured from metal. Such metal parts have been used in aircraft and similar applications because of their high strength characteristics. However, these same metal parts are known to be relatively heavy. Consequently, in cases where a very large number of metal parts are used, the overall weight of the aircraft will be increased with the result that the performance (e.g., fuel consumption and speed) of the aircraft may be adversely affected.

To overcome this problem, designers have been making the same parts from non-metallic fiber reinforced material. In this case, an injection molding process is commonly used to manufacture relatively lightweight parts that are reinforced with short milled fibers. Nevertheless, it has been found that such short milled fiber reinforced parts lack the tensile and shear strength that is required to withstand extreme physical forces that are typically encountered by aircraft traveling at high speeds and high altitudes. Conventional injection molding techniques are not applicable to making non-metallic parts that are reinforced with long and continuous fibers which would advantageously increase the ultimate strength of the final parts.

SUMMARY OF THE INVENTION

In general terms, a mold and a method for molding are disclosed herein by which to enable high strength, lightweight fiber reinforced composite parts to be manufactured to replace heavier metal parts. The mold includes an internal mandrel around which is located a fiber pre-form to be molded. The fiber pre-form is preferably made from resin that is reinforced with long continuous woven fibers that are oriented at an angle relative to one another to establish a 3-D interlocking fiber braid. Initially, and prior to molding, the mandrel which carries the pre-form to be molded is seated on a lift which functions to raise the mandrel to an upper position in the mold.

The mold also includes an adjustable diameter compression ring and a hollow, cylindrical inwardly tapered compression ring support. The compression ring is formed by a plurality of loose compression ring segments that are adapted to slide along a sloping inside wall of the inwardly tapered compression ring support from an upper position of the compression ring support to a lower position. Prior to molding, a loading ramp is seated upon the compression ring support. The loading ramp guides the loose compression ring segments into the hollow compression ring support so as to lie against the sloping inside wall thereof in surrounding engagement with the fiber pre-form around the mandrel. Once the compression ring segments have been loaded into the compression ring support, an end cap is laid over the compression ring to hold the compression ring segments inside the mold during molding. The loading ramp is then removed from the mold.

When it is located at the upper position in the compression ring support, the compression ring has an open configuration and the loose compression ring segments are spaced circumferentially from one another. At the upper position, the compression ring segments will lie against the sloping inside wall at a relatively wide diameter of the compression ring support. In this case, the compression ring segments are disposed radially outward from the mandrel such that little compressive force is applied against the fiber pre-form.

When all of the compression ring segments are loaded into the compression ring support, the lift is removed from the mold. Next, an oven is heated to a temperature of about 770 degrees F. and the mold is then placed into the heated oven for approximately 20 minutes. The heated mold is then removed from the oven and moved to a (e.g., platen) press. The platen press applies an axial pushing force to the end cap to drive the heated mandrel and the compression ring downwardly through the compression ring support from the upper position therein to the lower position. When it is located at the lower position, the compression ring will have a closed configuration and the loose compression ring segments will now be moved end-to-end one another. That is, the compression ring segments will lie against the sloping wall at a relatively narrow diameter of the compression ring support. In this case, the compression ring segments are urged radially inwards towards the heated mandrel such that a compressive force is applied by the segments against the fiber pre-form. The platen press is permitted to cool to a temperature of approximately 450 degrees F. during which the combination of heat and pressure consolidates the fiber pre-form around the mandrel. The mold is then removed from the platen press and opened so that the resulting molded part can be separated from the mandrel and machined for its ultimate application.

DESCRIPTION OF THE PREFERRED EMBODIMENT

Figure 1:
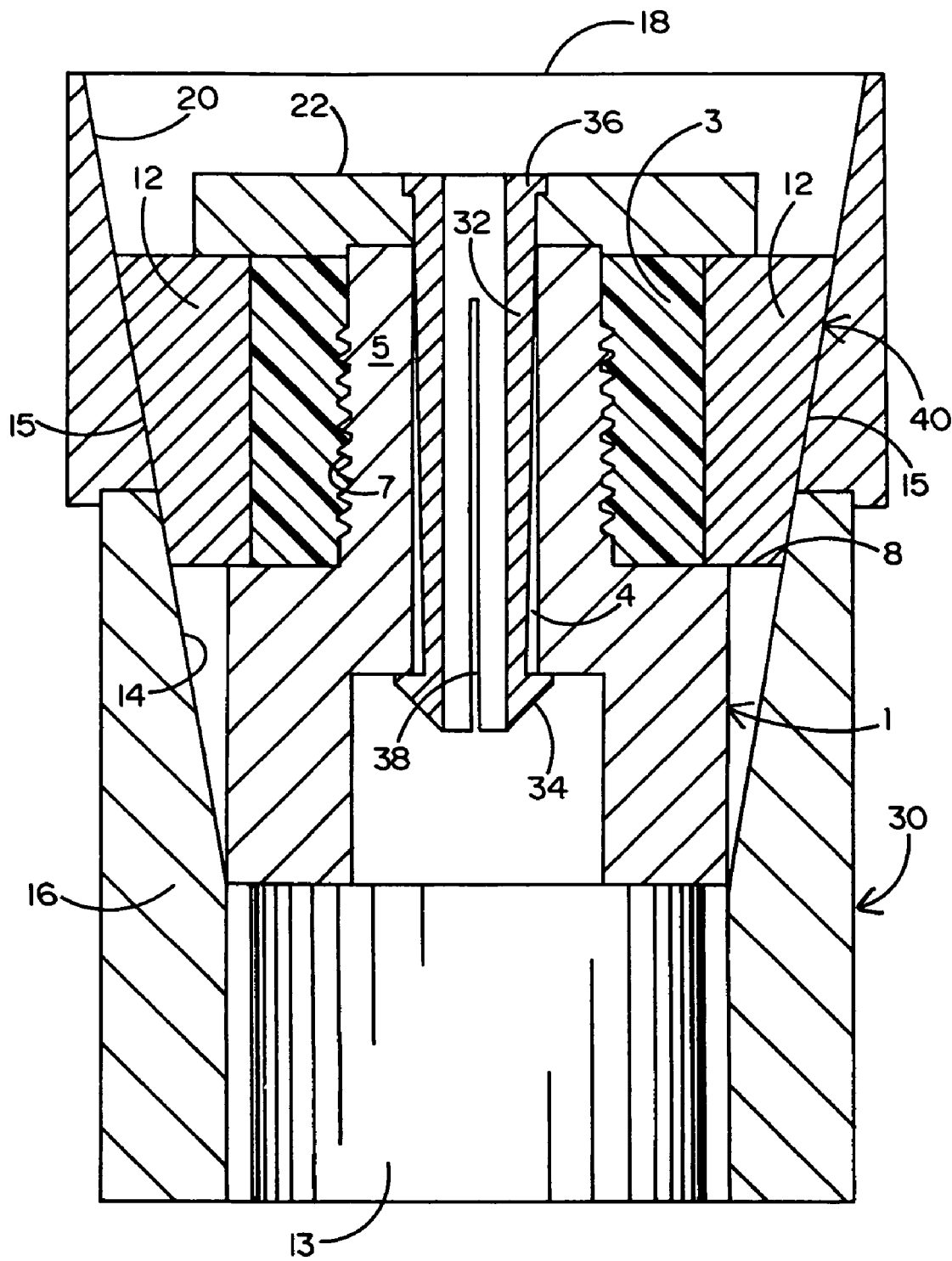
FIG. 1 is a cross-section of a mold according to a preferred embodiment of the present invention for molding non-metallic fiber reinforced composite parts, and including a segmented compression ring being shown in an open configuration.
Figure 2:
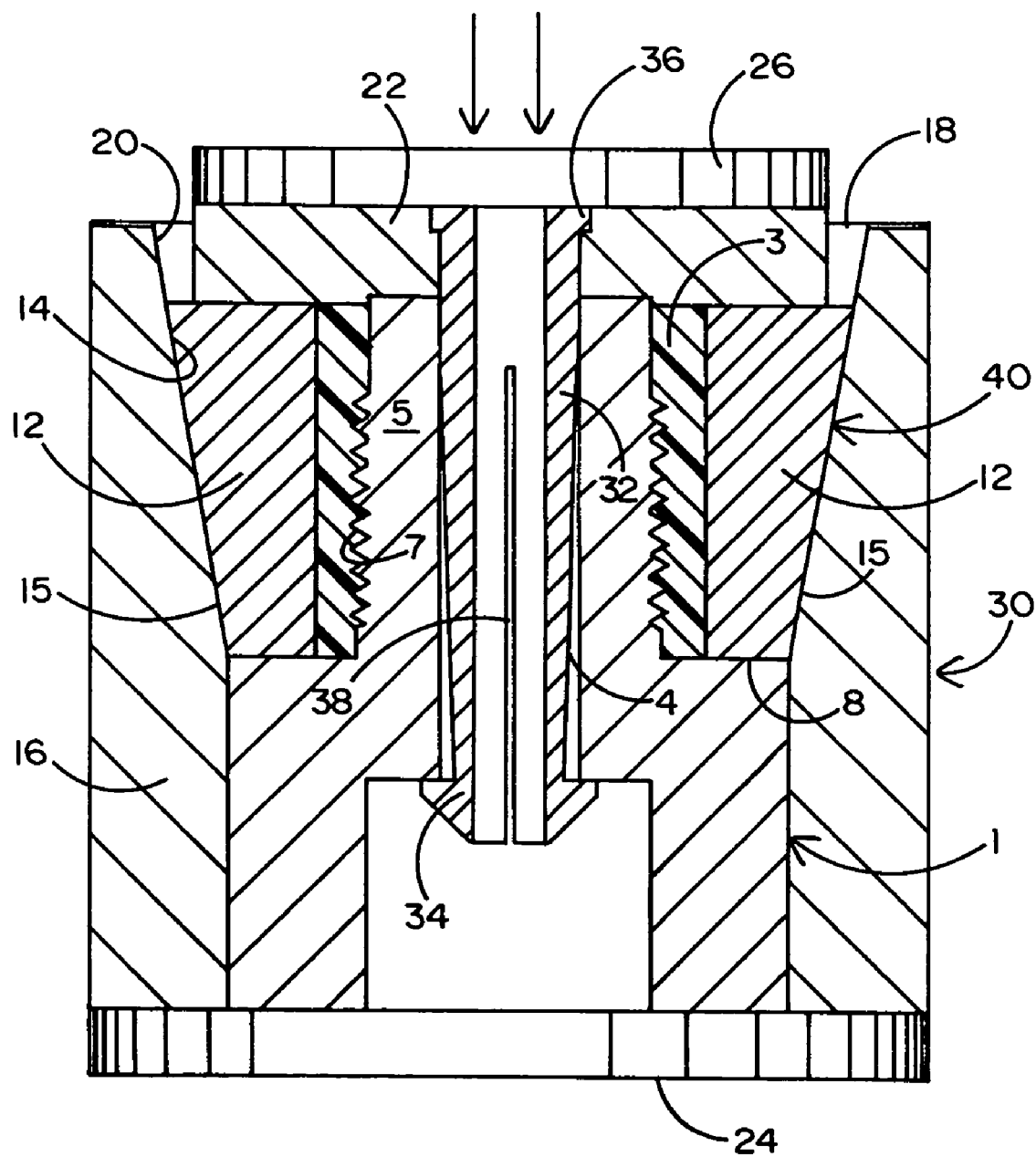
FIG. 2 is a cross-section of the mold of FIG. 1 during the molding process with the compression ring moved to a closed configuration.

Referring initially to FIGS. 1 and 2 of the drawings, there is illustrated a mold 30 according to a preferred embodiment of this invention having particular application for manufacturing high strength, lightweight, fiber reinforced composite parts. The mold 30 includes an internal mandrel 1 to carry an unmolded fiber pre-form 3 which, as will soon be explained, is to be molded under heat and pressure so as to be ready to be machined into its final shape. The unmolded pre-form 3 may have a cylindrical shape, as shown, or any other suitable (e.g., hexagonal) shape depending upon the application of the finished molded part.

A central channel 4 runs longitudinally through the internal mandrel 1. The mandrel 1 includes a cylindrical die portion 5 at a first end thereof around which the cylindrical fiber pre-form 3 is located. Die portion 5 has a set of screw threads 7 by which to create a corresponding set of screw threads inside the cylindrical pre-form 3 during the molding process. A relatively wide seat 8 is located at the opposite end of the mandrel 1 for a purpose that will soon be described.

Figure 3:
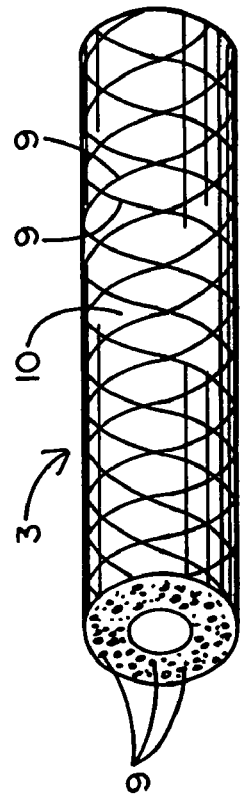
FIG. 3 illustrates a fiber reinforced resin pre-form to be located around a mandrel within the mold of FIGS. 1 and 2 and subjected to heat and pressure during the molding process.

By way of a particular example, and as is best shown in FIG. 3 of the drawings, the unmolded cylindrical fiber pre-form 3 to surround the die portion 5 of the internal mandrel 1 is manufactured from a (e.g., PEEK) resin 10 that is reinforced with long continuous woven carbon fibers 9. The fibers 9 of the pre-form 3 shown in FIG. 3 can be oriented to extend at an angle relative to one another to establish a 3-D interlocking fiber braid. However, it is to be understood that the shape and composition of the fiber pre-form 3 shown in FIG. 3 may change depending upon the ultimate application of the part to be molded. In this regard, the continuous fibers 9 may also be formed from graphite, glass, ceramic or any other suitable fiber material.

Returning to FIGS. 1 and 2, a plurality of loose (i.e., independent) compression ring segments 12 (best illustrated in FIGS. 6A and 6B) of a segmented, adjustable diameter compression ring 40 (best illustrated in FIGS. 4 and 5) are loaded into the mold 30 to lie upon the seat 8 of the internal mandrel 1 in surrounding engagement with the fiber pre-form 3. In FIG. 1, the mandrel 1 and the pre-form 3 carried thereby are initially located near the top of the mold 30. To this end, a temporary loading aid (or lift) 13 is placed into the mold 30 and the end of the internal mandrel 1 opposite the die portion 5 thereof is seated on the loading aid. The loading aid 13 raises the mandrel 1 and pre-form 3 to the top of the mold 30 until such time as when all of the compression ring segments 12 of compression ring 40 have been loaded into the mold. FIG. 1 shows the segmented compression ring 40 in an open configuration at an upper position in the mold 30 such that the compression ring segments 12 are separated from one another and spaced radially outward relative to the die portion 5 of mandrel 1.

In FIG. 2, the loading aid 13 of FIG. 1 has been removed from the mold 30 so that the internal mandrel 1 and the compression ring 40 seated thereon can be pushed downwardly through the mold 30 to a lower position. FIG. 2 shows the segmented compression ring 40 in a closed configuration at the lower position in the mold 30 such that the compression ring segments 12 are now pressed together and moved radially inward towards the die portion 5 to apply pressure to the fiber pre-form 3.

The loose compression ring segments 12 include curved outside faces 15 that are adapted to slide downwardly along a correspondingly curved and sloping inside wall 14 of a hollow, cylindrical inwardly tapered compression ring support 16 by which to cause the compression ring 40 to move from the open configuration (of FIG. 1) to the closed configuration (of FIG. 2) relative to the die portion 5. As will be explained in greater detail when referring to FIGS. 4 and 5, the sloping inside wall 14 of the inwardly tapered compression ring support 16 urges the compression ring segments 12 of compression ring 40 to move together and radially inward towards die portion 5 as the compression ring 40 moves from the upper position in the mold (at FIG. 1) to the lower position (at FIG. 2) so as to generate a compressive force against the fiber pre-form 3 carried by the internal mandrel 1.

A removable loading ramp 18 which includes a sloping inside wall 20 sits atop the compression ring support 16 of the mold 30 in FIG. 1 such that the sloping wall 20 of ramp 18 is aligned with the sloping inside wall 14 of support 16. The loading ramp 18 provides a guide surface along which the loose compression ring segments 12 of the compression ring 40 can slide so as to move into the mold and onto the sloping inside wall 14 of the compression ring support 16 in order to generate the compressive force against the fiber pre-form 3 when the compression ring 40 moves from the open configuration of FIG. 1 to the closed configuration of FIG. 2.

A cover or end cap 22 having a central opening formed therein is laid on top of the compression ring 40. The end cap 22 prevents the resin material of the fiber pre-form 3 from flowing out of the mold 30 during the molding operation when the compression ring 40 moves downwardly through the mold 30 to the closed configuration shown in FIG. 2 to apply a compressive force against the fiber pre-form to be molded. The end cap 22 also forces the compression ring segments 12 downwardly through the compression ring support 16.

A split locking plug 32 is carried by and projects outwardly from the central opening of the end cap 22. When end cap 22 is laid over the compression ring 40 as shown in FIG. 1, the split locking plug 32 will be inserted downwardly through the longitudinally extending central channel 4 of the mandrel 1 to maintain pressure on the compression ring segments 12 during the molding operation. The locking plug 32 has a wide head 34 at one end thereof which locks to the bottom of the mandrel 1 below seat 8 and a wide tail 36 at the opposite end at which to engage and hold the end cap 22 and thereby prevent a displacement of the loose compression ring segments 12 outside the mold 30. An axial slot 38 runs down each side of locking plug 32 to enable the plug to flex and thereby facilitate its insertion through the central channel 4 of mandrel 1.

After the compression ring segments 12 of compression ring 40 slide down the loading ramp 18 and onto the sloping inside wall 14 of the compression ring support 16 and the end cap 22 with locking plug 32 have been installed, the loading ramp 18 is removed from the mold. Next, an oven is initially heated to a temperature of about 770 degrees F. The mold, including each of the fiber pre-form 3 around die portion 5 of internal mandrel 1, the compression ring 40, and the compression ring support 16, is then placed in the heated oven for about 20 minutes.

The heated mold 30 is removed from the oven and placed into a (e.g., platen) press. As is best shown in FIG. 2, the platen press includes a stationary platen 24 at one end of the mold 30 and an opposing movable platen 26 at the opposite end of the mold. The movable platen 26 moves towards the stationary platen 24 to cause the compression ring 40 and the ring segments 12 thereof to slide downwardly along the inside wall 14 of the compression ring support 16.

As earlier disclosed, the inwardly tapered compression ring support 16 has a sloping inside wall 14. In particular, the inside diameter of a portion of the compression ring support 16 narrows continuously in a downward direction. With the compression ring 40 in the open configuration of FIG. 1 and located at its upper position in the mold 30, the compression ring segments 12 will lie against the sloping wall 14 at a relatively wide inside diameter of the compression ring support 16. Thus, in the open configuration of compression ring 40, the ring segments 12 will be spaced radially outward from the die portion 5 of mandrel 1 around which the fiber pre-form 3 is located.

When the movable platen 26 of the platen press moves downwardly toward the stationary platen 24, an axial pushing force is applied against the end cap 22. The axial pushing force is transferred to the mandrel 1 and to the compression ring 40 to cause mandrel 1 to move downwardly relative to the compression ring support 16. At the same time, the compression ring segments 12 are caused to move downwardly from the upper position in the mold 30 to the lower position so as to slide along the sloping inside wall 14 of the inwardly tapered compression ring support 16 from a point of relatively wide inside diameter (with the compression ring 40 of FIG. 1 in the open configuration) to a point of relatively narrow inside diameter (with the compression ring 40 now in the closed configuration of FIG. 2).

Figure 5:
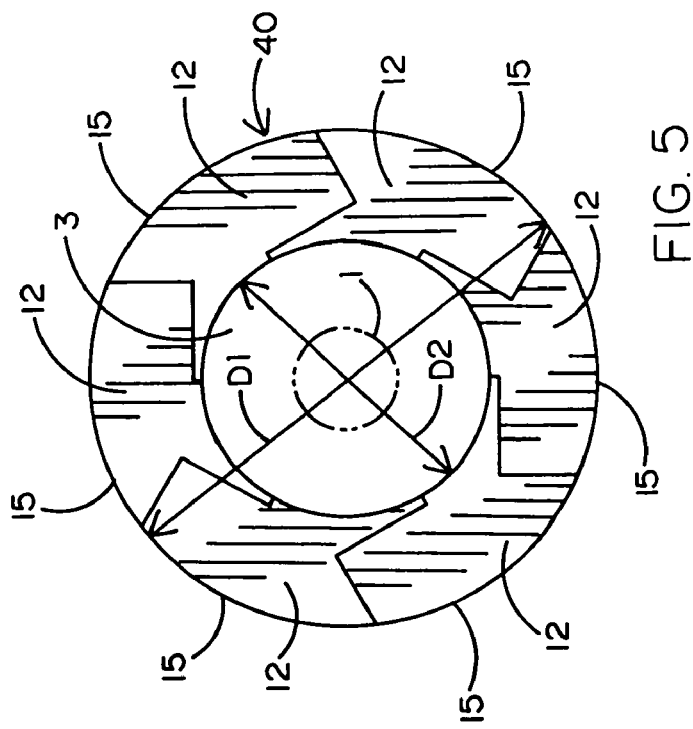
FIG. 5 illustrates the compression ring segments with the compression ring in the closed configuration of FIG. 2.
Figure 4:
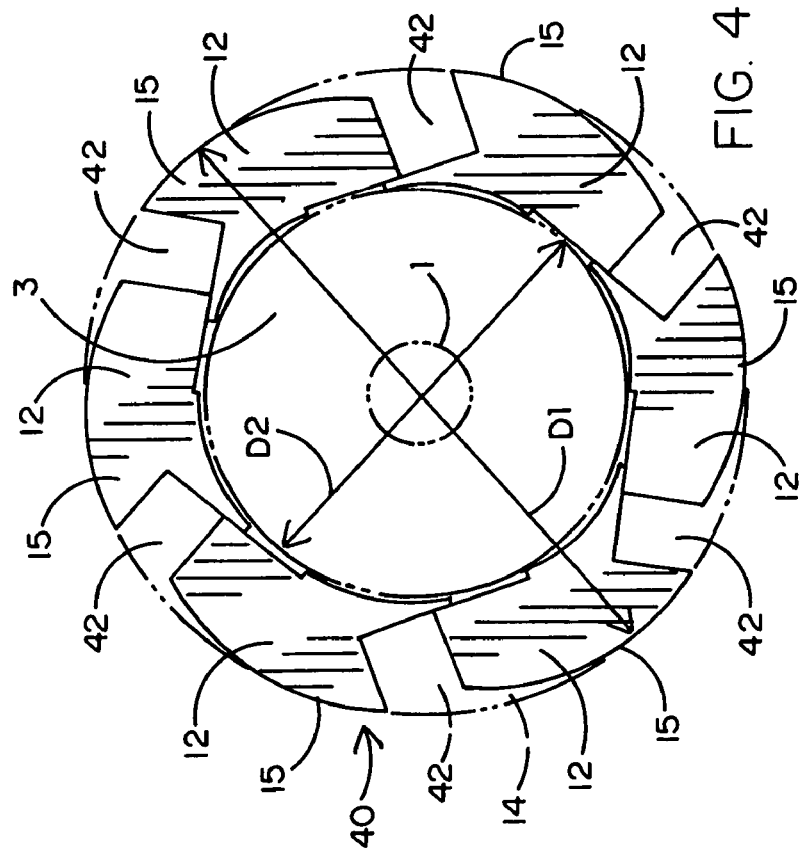
FIG. 4 illustrates a plurality of compression ring segments of the segmented compression ring in the open configuration of FIG. 1.

More particularly, and as will also be explained when referring to FIGS. 4 and 5, as the compression ring 40 is pushed downwardly through the mold 30 to slide along the sloping inside wall 14 of the inwardly tapered compression ring support 16 from the open configuration of FIG. 1 to the closed configuration of FIG. 2, the loose compression ring segments 12 will receive a pushing force which automatically urges the ring segments 12 to move radially inward towards the die portion 5. As the compression ring 40 continues to slide downwardly along the sloping inside wall 14 of the inwardly tapered compression ring support 16, the pushing force applied against the compression ring segments 12 will increase, whereby a corresponding increasing compressive force will be applied against the oven heated fiber pre-form 3 around die portion 5.

With the compression ring 40 pushed to the closed configuration of FIG. 2 and the compression ring segments 12 located at a point along the sloping inside wall 14 of the inwardly tapered compression ring support 16 at which to generate a maximum compressive force against the fiber pre-form 3, the mold 30 is permitted to cool, under pressure, within the press to a temperature of approximately 450 degrees F. The simultaneous application of heat and the pressure generated by the compression ring segments 12 when the compression ring 40 is moved to its lower position in the mold 30 and to the closed configuration of FIG. 2 consolidates the fiber reinforced resin of the pre-form into a solid mass and reduces the outside diameter thereof into a desired shape.

Following the application of heat and pressure to the pre-form 3, the platen press is opened and the mold 30 is removed. The mold is permitted to cool to a temperature of about 300 degrees F. to allow the molded fiber part to solidify. The mold 30 is then opened, and the molded fiber part is detached from the die portion 5 of the internal mandrel 1 at the screw threads 7 thereof. The molded (cylindrical) part is now ready to be machined and finished so as to be used for an application like that shown in FIG. 7.

Turning now to FIGS. 4 and 5 of the drawings, details are provided for the adjustable diameter compression ring 40 in the open and closed configurations within the mold 30 of FIGS. 1 and 2. In the open compression ring configuration of FIGS. 1 and 4, each of the plurality of loose compression ring segments 12 is loaded into the mold 30 (via the loading ramp 18) so as to be spaced circumferentially from the next ring segment by a small gap 42. As previously described when referring to FIG. 1, with the compression ring 40 in the open configuration at an upper position in mold 30, the compression ring segments 12 will lie at a point of maximum diameter along the sloping inside wall 14 of the inwardly tapered compression ring support 16 where little compressive force is applied against the fiber pre-form 3 being carried by mandrel 1. In this case, the compression ring 40 has a relatively large outside diameter D1 (e.g., 6.60 cm) and the pre-form 3 around mandrel 1 has a corresponding large outside diameter D2 (e.g., 4.24 cm).

In the closed compression ring configuration shown in FIGS. 2 and 5, the plurality of loose compression ring segments 12 are moved end-to-end one another, such that the gaps (designated 42 in the open configuration of FIG. 4) are eliminated. The compression ring 40 in the closed configuration is located at the lower position in the mold 30 and the compression ring segments 12 will lie at a point of reduced diameter along the sloping inside wall 14 of the inwardly tapered compression ring support 16, whereby an increased compressive force is generated against the fiber pre-form 3 to reduce the outside diameter thereof. In this case, the compression ring 40 will now have a relatively small outside diameter D1 (e.g., 5.08 cm), and the consolidated fiber pre-form 3 will have a relatively small outside diameter D2 (e.g., 2.84 cm).

Figure 6A:
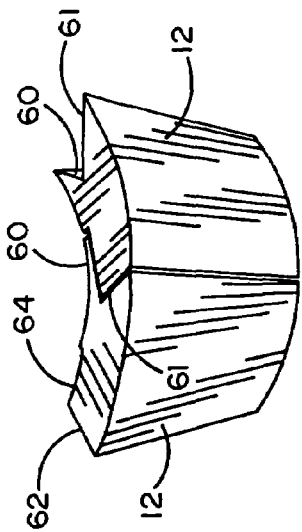
FIGS. 6A and 6B illustrate details of the compression ring segments of the compression ring moved from the open compression ring configuration of FIG. 4 where the segments are spaced circumferentially from one another to the closed compression ring configuration of FIG. 5 where the segments are moved end-to-end one another.
Figure 6B:
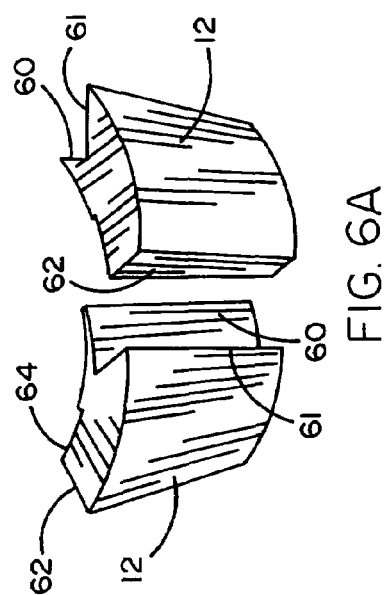

FIGS. 6A and 6B of the drawings show details of the loose compression ring segments 12 of the segmented compression ring 40 which slides from an upper position in the mold 30 (of FIG. 1) to a lower position (of FIG. 2) to apply an increasing compressive force against the fiber pre-form 3 that is carried at the die portion 5 of mandrel 1. Each compression ring segment 12 has a generally arcuate shape so as to complete the compression ring 40 when the plurality of segments 12 are moved end-to-end one another under the urging of the sloping inside wall 14 of the inwardly tapered compression ring support 16.

One end of each compression ring segment 12 has a pair of outstretched edges 60 and 61, and the opposite end 62 is flat and square. The edges 60 and 61 are aligned to form a 90 degree angle therebetween. With the compression ring 40 moved to the closed configuration (of FIGS. 2 and 5) at the lower position in the mold 30, the flat end 62 of a leading segment 12 is moved into receipt between the opposing angled edges 60 and 61 of a trailing segment. A thin planar recess 64 is formed in the inside face of each compression ring segment 12. One edge 60 of the angled end of the trailing compression ring segment 12 is moved into the recess 64 formed in the leading segment to maintain the end-to-end alignment of the segments. That is, and as was explained while referring to FIGS. 4 and 5, when the compression ring 40 is in the open configuration, the compression ring segments 12 are spaced circumferentially from one another by a gap 42 (best shown in FIG. 6A). When the compression ring 40 is in the closed configuration, the compression ring segments 12 are urged into mating engagement with one another and the gaps 42 therebetween are eliminated (best shown in FIG. 6B).

Figure 7:
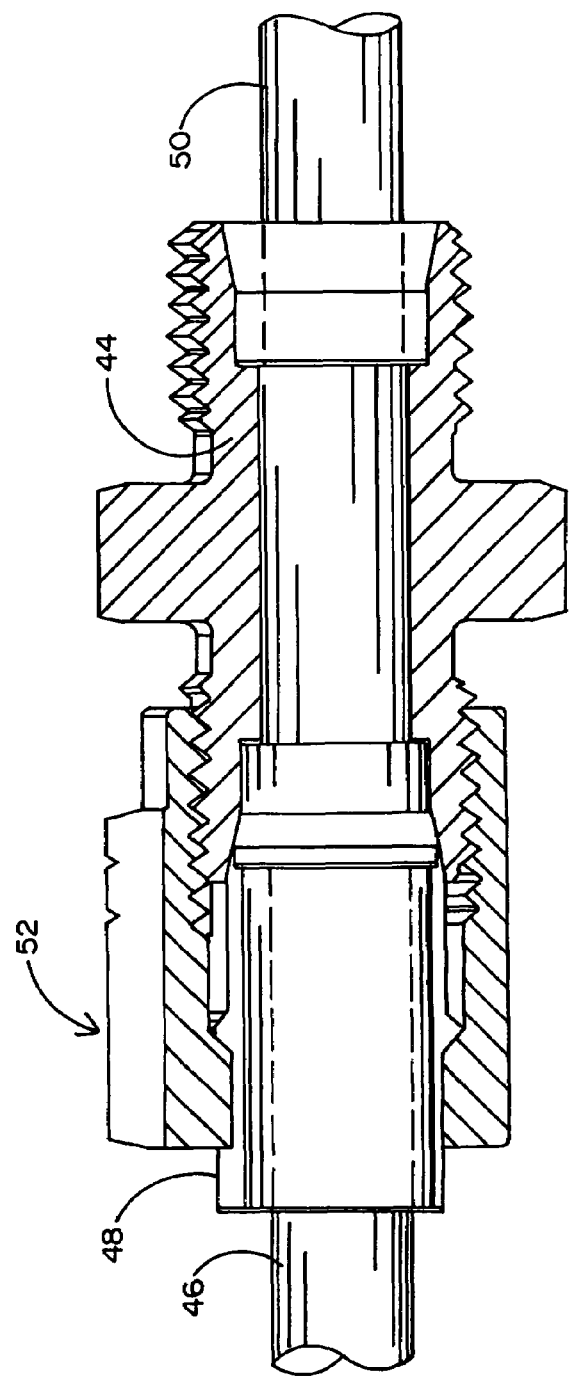
FIG. 7 illustrates one application of the non-metallic fiber reinforced composite part that is manufactured by means of the mold and the method of molding of FIGS. 1-6.

FIG. 7 of the drawings illustrates a hydraulic coupling application for the composite fiber-reinforced part that was manufactured by means of the mold and the particular method of molding that were disclosed when referring to FIGS. 1-6. By way of example only, following its molding and subsequent machining, the (e.g., cylindrical) composite fiber-reinforced part can be employed as a lightweight, high strength internally threaded B-nut 52 by which to couple two lengths of hydraulic tubing. More particularly, a first hydraulic tubing 46 is connected to a metallic sleeve 48. A second hydraulic tubing 50 is connected to a screw threaded first end of a union 44. The sleeve 48 is then moved inwardly of a screw threaded opposite end of the union 44.

The screw threaded fiber-reinforced composite B-nut 52 is mated in surrounding engagement to the screw threaded opposite end of union 44 to generate a compressive force and thereby maintain the receipt of the sleeve 48, to which the first hydraulic tubing 46 is connected, by the union 44, to which the second hydraulic tubing 50 is connected. The compressive force generated by the B-nut 52 prevents the sleeve 48 from pulling out of the union 44 and avoids hydraulic leaks at the interface therebetween. In the example of FIG. 7, it has been found that a hydraulic coupler including the composite B-nut 52 is capable of withstanding pressures of approximately 1500 psi. By virtue of the foregoing, the non-metallic B-nut can be used to replace conventional larger weight metal B-nuts without sacrificing strength or reliability.

In this same regard, other lightweight, high strength non-metallic fiber reinforced composite parts having different shapes and internal or external screw threads can also be manufactured pursuant to the teachings of this invention including bearings, cylinders, fasteners, electrical housings, and the like, where it is desirable to use any one or a combination of a long continuous fiber structure, a woven fiber structure, or a 3-D fiber orientation. The precise shape of the final part can be changed by changing the shape of the die portion 5 of the internal mandrel 1 as well as the fiber pre-form 3 to be located around the die portion.

We claim:

1. A mold for making a non-metallic molded part having an initial thickness, said mold comprising:

a mandrel around which an unmolded non-metallic pre-form formed from non-metallic material is located;

a compression ring support for surrounding said mandrel and having a first inside diameter at a first at-rest position thereof, a second smaller inside diameter at a second position thereof, and a sloping inside wall running between said first and second positions;

an adjustable diameter compression ring disposed within said compression ring support so as to engage the unmolded non-metallic pre-form around said mandrel and slide along the sloping inside wall of said compression ring support, a cover positioned above said adjustable diameter compression ring so as to engage and cover the unmolded non-metallic preform, said mandrel, said adjustable diameter compression ring and said cover all moving through said compression ring support from the first at-rest position thereof, at which said compression ring has an open and expanded configuration and a first diameter for applying a first compressive force against the unmolded non-metallic pre-form around said mandrel, to the second position thereof, at which said compression ring has a closed and contracted configuration and a second diameter which is smaller than said first diameter for applying a second compressive force which is greater than said first compressive force against the pre-form for consolidating the preform so that the initial thickness of the preform is reduced between said compression ring and said mandrel, and a locking stem extending through said cover and said mandrel, said locking stem having a locking head at one end thereof for engaging said mandrel and a locking tail at the opposite end for engaging said cover to hold said cover against said mandrel and said compression ring against said compression ring support at each of said first at-rest and second positions, said mandrel, said adjustable diameter compression ring and said cover being held together by said locking stem in surrounding engagement with all sides of the non-metallic pre-form at each of said first at-rest position and said second position so as to leave no gaps and thereby create a seal in order to prevent the escape of the non-metallic material of the non-metallic pre-form from said mold.

2. The mold recited in claim 1, wherein said adjustable diameter compression ring includes a plurality of compression ring segments that are spaced circumferentially from one another in the open and expanded compression ring configuration at the first at-rest position of said compression ring support, said compression ring segments being moved towards one another to the closed and contracted compression ring configuration at the second position of said compression ring support.

3. The mold recited in claim 2, wherein each of said plurality of compression ring segments has an arcuate shape, said arcuate compression ring segments being moved end-to-end one another in the closed and contracted compression ring configuration at the second position of said compression ring support.

4. The mold recited in claim 3, wherein each of said plurality of arcuate shaped compression ring segments has a curved outside wall to lie against and slide along the sloping inside wall of said compression ring support when said variable diameter compression ring moves through said compression ring support from said first at-rest position thereof to said second position.

5. The mold recited in claim 3, wherein each of said plurality of arcuate shaped compression ring segments has a pair of outstretched edges at a first end thereof and a square opposite end, the square opposite end of each of said compression ring segments being received between the outstretched edges at the first end of an adjacent one of said compression ring segments when said compression ring segments are moved end-to-end one another to the closed and contracted compression ring configuration at the second position of said compression ring support.

6. The mold recited in claim 1 wherein each of said cover and said mandrel has an opening formed therethrough for receipt of said locking stem.

7. The mold recited in claim 2, further comprising a removable loading ramp having a sloping wall, said loading ramp communicating with said compression ring support such that the sloping wall of said loading ramp is aligned with the sloping inside wall of said compression ring support for guiding the plurality of compression ring segments of said adjustable diameter compression ring along said loading ramp and into said compression ring support.

8. The mold recited in claim 1, further comprising a removable lift located within said compression ring support, said mandrel being seated upon said lift so that said mandrel and the unmolded non-metallic pre-form located therearound are located at the first at-rest position of said compression ring support.

* * * * *